Fig. 3.

H. T. HERR.
TRANSMISSION MECHANISM.
APPLICATION FILED AUG. 28, 1915.

1,346,888.

Patented July 20, 1920.
11 SHEETS—SHEET 5.

Fig. 5.

INVENTOR.
Herbert T. Herr
BY
HIS ATTORNEY IN FACT

Fig. 6.

H. T. HERR.
TRANSMISSION MECHANISM.
APPLICATION FILED AUG. 28, 1915.

1,346,888.

Patented July 20, 1920.
11 SHEETS—SHEET 10.

Fig. 12. REVERSE

Fig. 19. 1st Speed Ahead.

Fig. 20. 2nd Speed Ahead.

Fig. 21. 3rd Speed Ahead.

INVENTOR.
Herbert T. Herr.
BY
HIS ATTORNEY IN FACT

H. T. HERR.
TRANSMISSION MECHANISM.
APPLICATION FILED AUG. 28, 1915.

1,346,888.

Patented July 20, 1920.
11 SHEETS—SHEET 11.

INVENTOR.
Herbert T. Herr.
BY
HIS ATTORNEY IN FACT

UNITED STATES PATENT OFFICE.

HERBERT T. HERR, OF PITTSBURGH, PENNSYLVANIA.

TRANSMISSION MECHANISM.

1,346,888.  Specification of Letters Patent.  Patented July 20, 1920.

Application filed August 28, 1915. Serial No. 47,782.

*To all whom it may concern:*

Be it known that I, HERBERT T. HERR, a citizen of the United States, and a resident of Pittsburgh, in the county of Allegheny and State of Pennsylvania, have made a new and useful Invention in Transmission Mechanism, of which the following is a specification.

This invention relates to transmission mechanism and particularly to transmission mechanism capable of being employed in self-propelled vehicles, such as automobiles.

It is well known that internal combustion engines such as are ordinarily employed in driving self-propelled vehicles do not operate efficiently under wide variations of load and they cannot be overloaded without stalling. It is common practice to provide some means, such as a reduction gearing, between the propelling engine and the driving wheels of the vehicle for the purpose of varying the effective speed ratio of the engine on the driving wheels. In this way the load on the engine is maintained substantially constant for wide variations in the resistance to propulsion offered by the vehicle. In other words, it is common practice to employ means between the engine and the driving wheels for maintaining the load on the engine substantially constant for all variations of resistance encountered by the driving wheels. It is also common practice to employ means, such, for example, as a clutch for operatively disconnecting the engine from the driving wheels at the time of starting the engine, since internal combustion engines are not self-starting and since the power developed by them is approximately proportional to the speed.
While various means have been proposed for varying the effective torque or purchase of the engine on the driving wheels for the purpose of maintaining a substantially constant load on the engine, it has been found in practice that reduction gearing are more satisfactory than other forms of torque-varying apparatus, and they are therefore almost universally employed in vehicles propelled by internal combustion engines. When such gears are employed it is necessary to operatively disconnect the engine from the driving wheels and at the time of shifting the gears. This operation is ordinarily termed "throwing out the clutch," and the operation of operatively connecting the engine to the driving wheels is termed "throwing in the clutch."

An object of my invention is to provide a transmission mechanism, that is, a mechanism including a clutch mechanism between the engine and driven agent, and means for varying the torque or purchase of the engine on the driven agent, which operates automatically in response to variations in the resistance offered by the driven agent, and maintains the load on the driving engine substantially constant.

A further object is to produce a transmission mechanism including reduction or speed change gearing in which means are employed for either manually or automatically shifting the gears of the speed change mechanism, for throwing out the clutch prior to shifting the gears, and for throwing in the clutch immediately after the gears are shifted.

A further object is to provide a new and improved automatically controlled transmission mechanism for self-propelled vehicles, which may be manually controlled.

A further object is to produce a new and improved pneumatically actuated transmission mechanism for self-propelled vehicles, which may be controlled either manually or automatically to maintain a substantially constant load on the propelling or driving engine, independently of the variations in road resistance encountered by the driving wheels of the vehicle.

These and other objects, which will be made apparent throughout the further description of the invention, are attained by means of apparatus embodying the features herein illustrated and described.

In the drawings accompanying and forming a part hereof

Fig .4 is a sectional view along the line Y—Y of Fig. 3, or along the line Y—Y of Fig. 6;

Fig. 11ª is a fragmental plan view of a notched segment mounted on the steering wheel column and shown in sectional elevation in Fig. 11.

The apparatus illustrated as an embodiment of my invention includes a change speed mechanism, which may be of any type desired, and is generally illustrated at 20 in Figs. 1, 2, 4, and 6. It also includes a clutch mechanism 21 for operatively connecting and disconnecting the engine and the driving wheels, and an automatic mechanism for controlling both the operation of the clutch and the speed change mechanism. The automatic mechanism illustrated includes a load responsive device, herein illustrated as a centrifugally controlled device 23, which controls the operation of a master valve 24 and, through the agency of the master valve, a number of auxiliary valves 25, 26, 27, and 28. The auxiliary valves 25, 26, 27 and 28 respectively control the operation of pressure actuated plungers 29, 31, 32, and 33. The master valve also controls the operation of the clutch mechanism 21, and the apparatus illustrated includes means, illustrated in Fig. 11, for rendering the automatic mechanism inoperative and for manually controlling the transmission mechanism.

Figure 6:
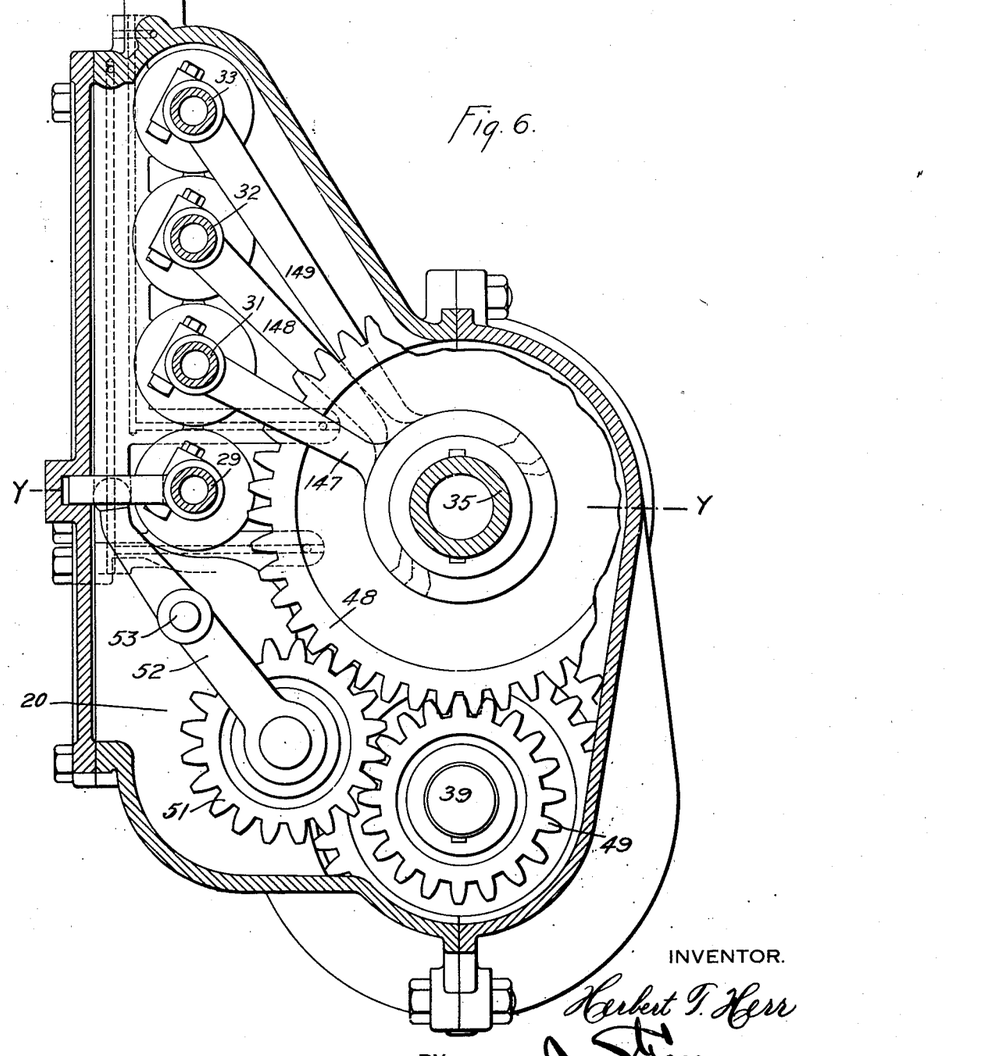
Fig. 6 is a sectional view along the line Z—Z of Fig. 1;
Figures 7, 8:
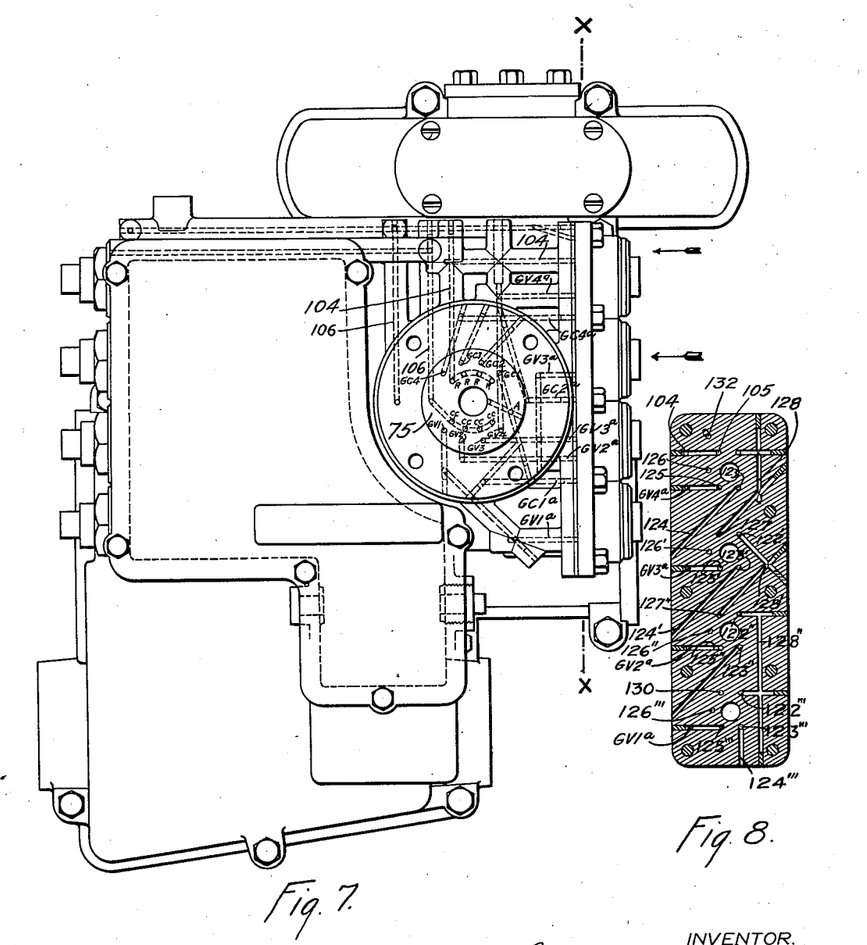
Fig. 7 is a plan view of the apparatus shown in Fig. 1 with the master valve cover removed for the purpose of illustrating the master valve.
Fig. 8 is a fragmental, sectional view along the line X—X of Fig. 7.

As illustrated, the engine shaft 34 is operatively connected to the clutch mechanism 21, which is capable of being thrown into operation to operatively connect the shaft 34 to the driving shaft 35 of the speed change mechanism, or of being thrown out of operation for the purpose of operatively disconnecting the shaft 34 from this shaft 35 and of allowing the engine to run idle. The clutch 21, which will hereinafter be described in detail, is provided with a shaft 36, capable of being operatively connected to the engine shaft 34, and shown provided with a gear 37, which continuously meshes with a gear 38, rigidly mounted on a counter-shaft 39 of the speed change mechanism 20. The gear 37 is so constructed that it forms one element of a clutch device 40, which is capable of operatively connecting the shaft 36 directly to the shaft 35 of the speed change mechanism. As illustrated, the gear 37 is provided with a series of recesses 41 formed in its hub portion and adapted to receive laterally extending teeth 42 formed on a sleeve 43, which is splined on, but is movable longitudinally along the shaft 35 and forms one element of the clutch device 40. When the teeth 42 are moved into engagement with the recesses 41 of the gear 37, or, in other words, when the clutch device 40 is thrown in, the engine shaft 34 is directly connected to the shaft 35, through the agency of the clutch mechanism 21; and the propelling shaft 44 of the vehicle is driven at high speed. In shifting the gears to drive the vehicle at intermediate speed, the clutch 40 is thrown out, and a gear 45, splined on the shaft 35, is moved into mesh with a gear 46, which is rigidly mounted on the counter-shaft 39. Under such conditions power is transmitted from the engine to the propelling shaft through the clutch mechanism 21, the gears 37 and 38, the shaft 39, the gears 46 and 45, and the shaft 35, it being understood that any suitable connection, such, for example, as a universal joint 47, may be employed between the shaft 35 and the propelling shaft 44. In shifting the gears for the purpose of driving the vehicle at low speed, the gear 45 is moved out of mesh with the gear 46, and a gear 48, splined on the shaft 35, is moved into mesh with a gear 49 rigidly mounted on the counter-shaft 39, it being understood that the clutch device 40 remains out. In Fig. 6 I have illustrated the reversing gears of the transmission mechanism, which include the gears 48 and 49 and a wide idler gear 51, mounted on a lever 52 and capable of being swung about the pivotal point 53 of the lever for the purpose of being moved into mesh with the gears 48 and 49 while they occupy the position illustrated in Fig. 1. The speed change gear illustrated is similar in construction to well known types now in use and it is believed that a more detailed description is unnecessary. While the operation of this gearing is similar to that of the ordinary speed change gearing, the gears 45 and 48 and the sleeve 43 are shifted through the agency of the respective plungers 33, 32, and 31, (see Fig. 10) and the idler or reversing gear 51 is swung out of and into mesh with the gears 48 and 49 by means of the plunger 29.

Figure 9:
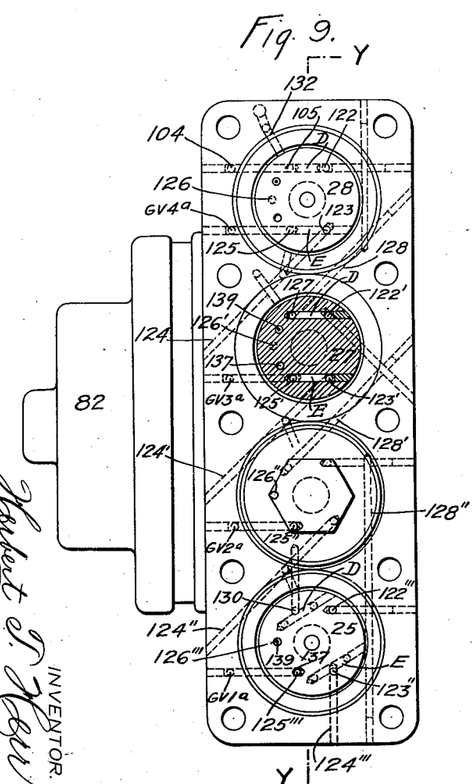
Fig. 9 is a side elevation of a portion of the apparatus shown in Fig. 7 looking in the direction of the arrows in Fig. 7, a portion of the apparatus being shown in section for convenience of illustration.

The operation of each of the gear-shifting plungers is controlled through the agency of the master valve 24 and one of the auxiliary valves shown in Figs. 9 and 10, as will be fully described hereinafter.

Figure 1:
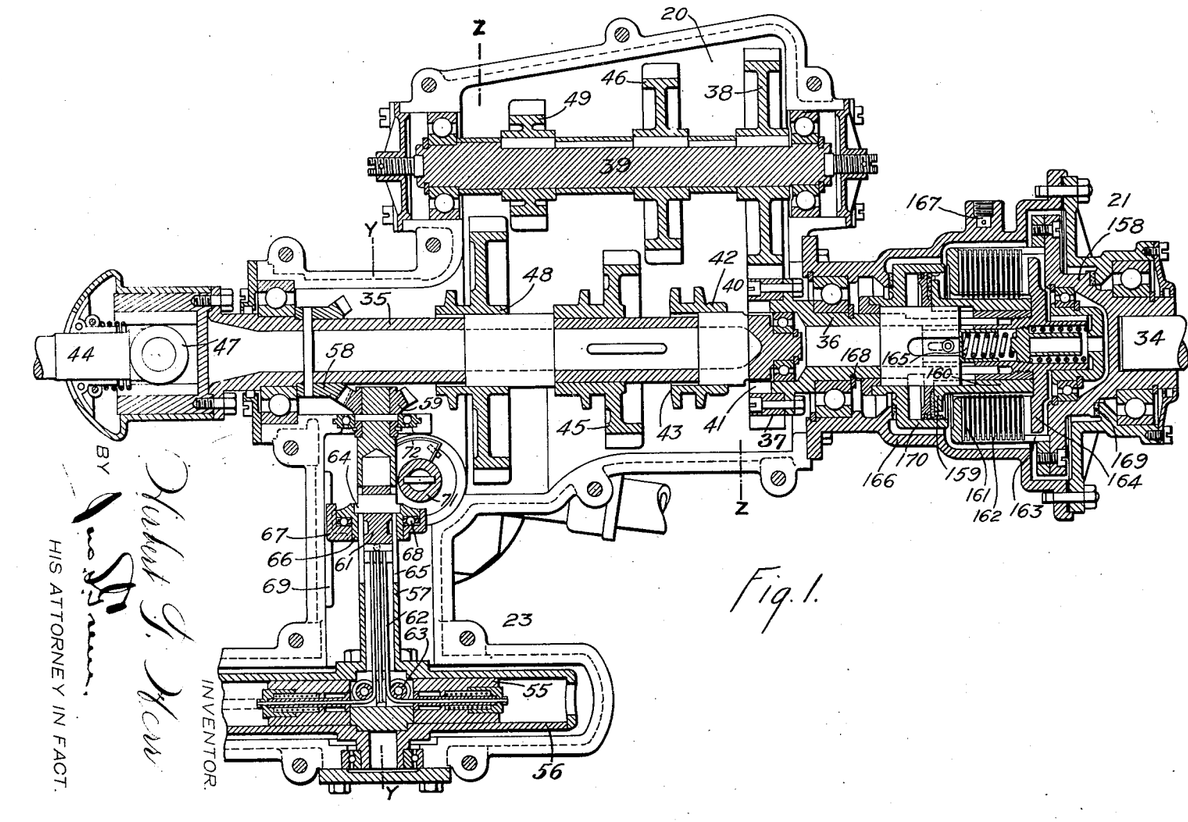
Figure 1 is a sectional view of a transmission mechanism embodying my invention.
Figure 5:
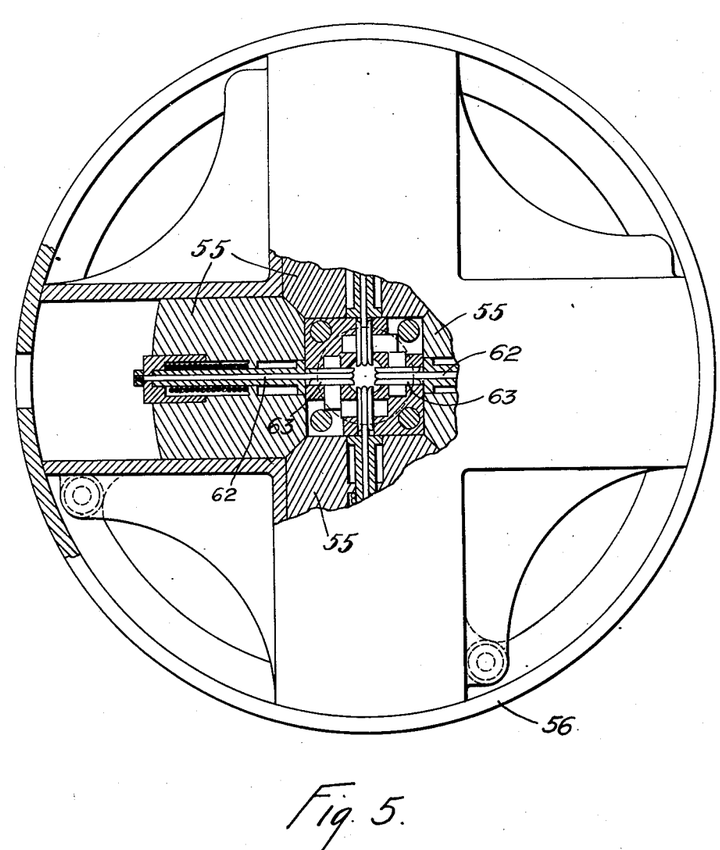
Fig. 5 is a sectional view along the line X—X of Fig. 2.

In controlling the operation of the auxiliary valves, the master valve is turned to different positions, and this may be accomplished by the load-responsive device 23 which, as illustrated, includes centrifugally controlled weights 55 located in a rotatable casing 56 which is mounted on or forms a part of a hollow shaft 57, operatively connected to the shaft 35 by means of bevel gears 58 and 59. As illustrated in Fig. 5, four weights 55 are employed and each is adapted to move radially, with relation to the casing 56, in response to centrifugal force. As shown in Figs. 1 and 5 each weight is operatively connected to a plunger 61, which is located within the hollow shaft 57 and is adapted to move to different positions along the shaft in response to variations in the positions of the weights 55. Any suitable means may be employed for connecting the weights to the plunger, but as illustrated I have provided flexible connections such as wires 62, and each wire passes over a separate sheave-pulley 63, which is suitably journaled within the casing 56. The plunger 61 is provided with lugs or projections 64 which extend through longitudinally extending slots 65, in the hollow shaft 57, and which are rigidly secured to a sleeve 66 mounted on the shaft 57 and adapted to move with the plunger longitudinally along it. The sleeve 66 is operatively connected to an annular cap 67 by means of a ball bearing connection 68. The cap is held against rotary motion by means of a guide 69 mounted on the casing of the speed change mechanism and projecting into a guide slot formed in the cap. The cap is connected to a shaft 71 by means of a flexible connection, such as flat curved springs 72, shown in Fig. 3 as secured at one end to the cap and at the other to a spool 73 mounted on the shaft 71. The centrifugal pull of the weights 55 tends to rotate the shaft 71. This rotation is yieldingly resisted, in the mechanism illustrated, by means of a coil spring 74 which surrounds the shaft 71 and is secured to it at one end and at the other end to the casing of the mechanism, so that it performs the function of a torsion spring.

Figure 3:
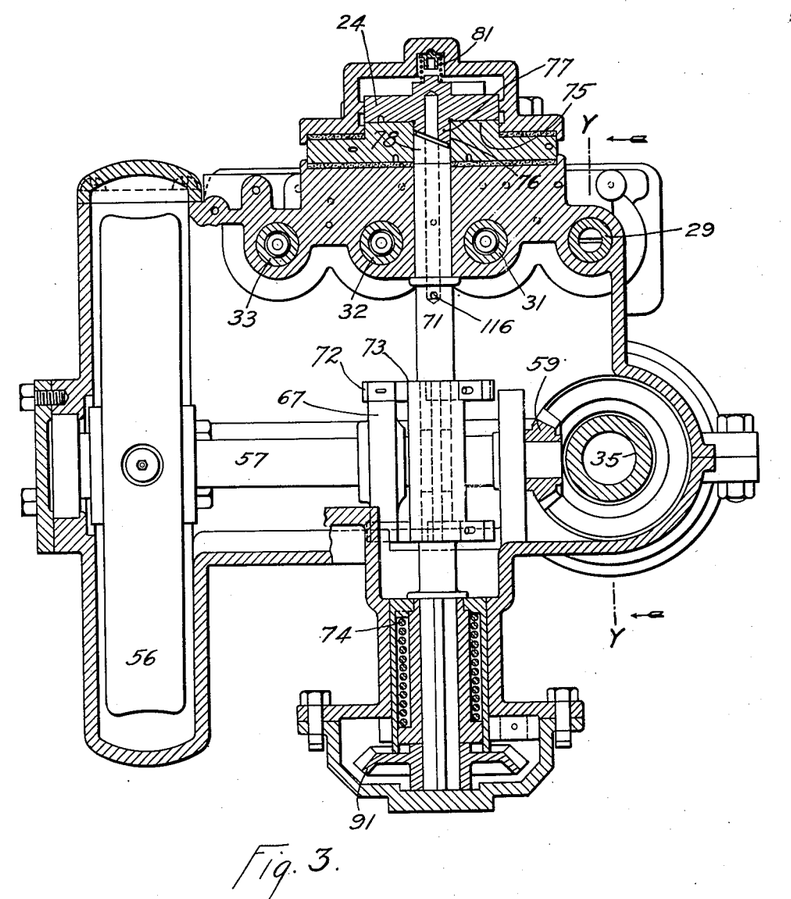
Fig. 3 is a sectional view along the line Y—Y of Fig. 1.

The opposite end of the shaft 71, from that to which the spring 74 is secured, is connected to the master valve 24, as is clearly shown in Fig. 3.

As illustrated, the master valve is what may be termed a cover valve and is adapted to be moved to different positions for the purpose of establishing communication between ports formed in its seat 75. The valve and its seat 75 are preferably circular, and the seat is provided with a central aperture or bore 76, into one end of which the shaft 71 projects and into the other end of which a centering lug 77 formed on the valve 24 projects.

In the apparatus illustrated I have provided a special form of connection between the shaft 71 and the master valve 24 which insures the proper positioning of the valve on its seat. The end of the lug 77 is provided with a slot 79, shown in Figs. 15 and 16, adapted to receive a rectangular extension 78 (shown in Fig. 3) formed on the shaft 71. The end face of the extension extends at an angle, other than a right angle, to the axis of the shaft, and the slot 79 is also provided with a correspondingly inclined inner face. With this arrangement the position of the valve cannot be reversed with relation to the shaft 71, since, in such a position the valve will not seat. Sufficient clearance is, however, maintained between the extension 78 and the inner inclined face of the slot 79 to insure the seating of the valve, and in Fig. 3 I have shown a spring 81, located between the valve and a valve cover 82, which yieldingly holds the valve to its seat.

With this arrangement of apparatus the valve 24 is turned to different positions in response to variations in the speed of the shaft 35, this being accomplished, as previously described, through the agency of the centrifugal weights 55.

In order to prevent hunting of the shaft 71, and consequently of the valve 24, I have provided means for yieldingly holding the shaft 71 and consequently the valve 24 in different determined positions, to which they may be moved by the coöperation of the weights 55 and the torsion spring 74, until the pull of the weights or of the opposing spring 74 is sufficient to shift the position of the valve 24 from one determined position to another. This is accomplished by providing a finger 84, which is yieldingly held against an arc-shaped segment 85 by means of a coil spring 86, and which is adapted to move into engagement with one or another of a number of recesses 87, 88, 89, and 90 formed in the periphery of the segment 85. This apparatus is clearly illustrated in Figs. 11 and 11ª, and, as is apparent, provides four different angular positions for the valve 24 with relation to its seat 75. When the valve is moved to such a position that the finger 84 projects into the recess 87, the reversing gear 51 will be moved into mesh with the gears 48 and 49 through the agency of the auxiliary valve 25 and the gear-shifting plunger 29. When the finger 84 is located in the recess 88, the master valve 24 will occupy a corresponding position and will render the low speed gears 48 and 49 effective through the agency of the auxiliary valve 26 and the plunger 31 controlled by it. With the finger 84 in the recess 89, the intermediate gears 46 and 45 will be rendered effective through the agency of the master valve 24, the auxiliary valve 27 and the plunger 32; and with the finger 84 in the recess 90, the master valve will effect a direct connection between the shaft 36 of the clutch mechanism 21 and the shaft 35 of the speed change gearing, and thereby cause the vehicle to be driven at high speed. This is accomplished through the agency of the valve 28 and the plunger 33, which is adapted to shift the sleeve 43. While the reversing pinion 51 is exclusively manually controlled, the other gear shifts above described may be either automatically controlled by means of the load responsive device 23 or may be manually controlled.

Figures 11, 11A:
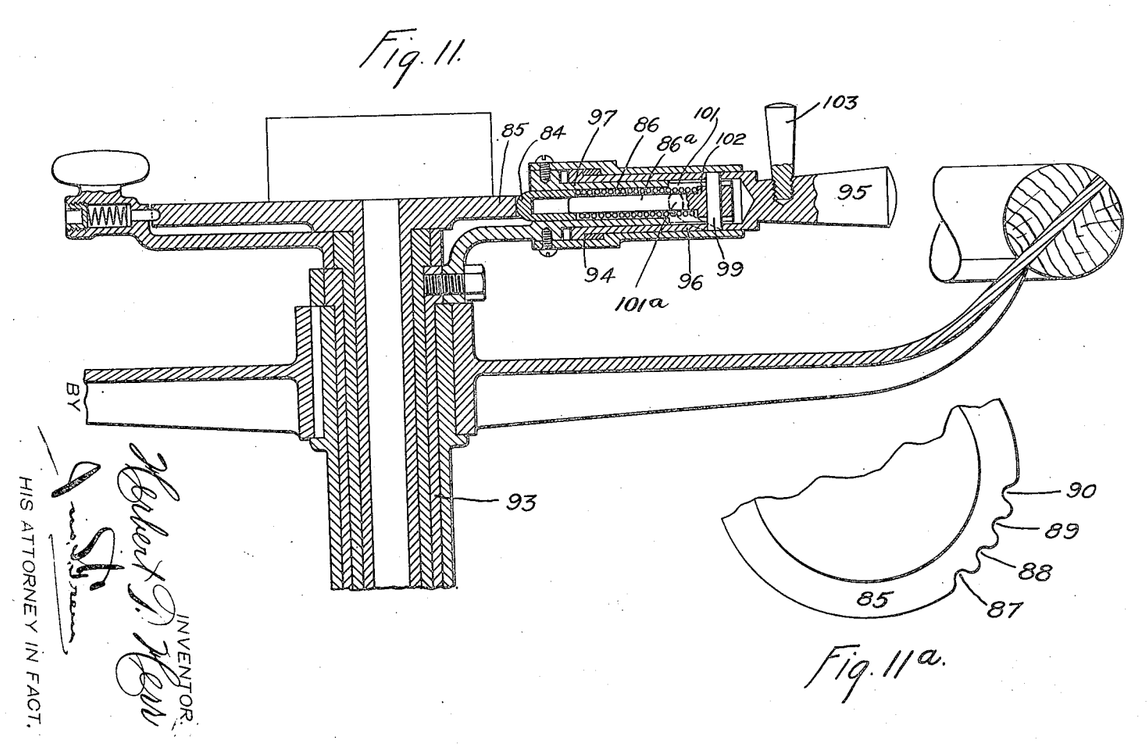
Fig. 11 is a fragmental sectional view of a steering column and a steering wheel of a self-propelled vehicle equipped with my invention, and illustrates means employed in the illustrated embodiment for rendering the automatic control of the mechanism ineffective and for manually controlling the mechanism.

The apparatus illustrated in Figs. 11 and 11ª and described above is mounted on the steering column of the vehicle and is operatively connected to the shaft 71 (Figs. 1, 2, 3, and 4) by means of bevel gearing, (one of which is shown at 91 in Fig. 3) a shaft 92, and a hollow shaft 93, which forms a part of the steering column. The finger 84 is located in a cylindrical guide 97, forming a part of a casing 94, which is mounted on and is rigidly secured to the hollow shaft 93, as shown in Fig. 11. This casing is adapted to move concentrically about the arc-shaped segment 85 and, as illustrated, is provided with a handle 95, which may be employed in manually shifting it, and consequently the master valve 24, to any desired position. As illustrated, the handle is provided with a tubular extension 96, which telescopes the cylindrical guide 97 and is capable of being turned around the guide 97 for the purpose of locking the finger 84 into one or the other of the recesses 87, 88, 89, or 90, and of thereby rendering the automatic or load responsive device 23 incapable of shifting the position of the master valve 24. A spring guide pin 86a projects into the rear end of the finger 84 and is operatively connected to the extension 96, of the handle 95, and to the guide 97 by means of a pin 99, a helical slot 101, formed in the extension 96, and a straight axially extending slot 101a, formed in guide 97. The coil spring 86 surrounds the pin 86a, one end abutting against a finger 84 and the other against a shoulder formed on the pin 86a. With this arrangement, turning the handle 95 about the extension 97 moves the pin 99 along the helical slot 101, thereby shifting the position of the pin 86a and compressing the spring 86 to such an extent that it positively locks the finger 84 into one or the other of the recesses formed in the segment 85, it being understood that the straight slot 101a prevents the pin 86a from turning. For the purpose of turning the handle 95, it is provided with a thumb lever 103, which is turned from a vertical to a horizontal position for the purpose of locking the pin 84.

Figures 13, 15, 16:
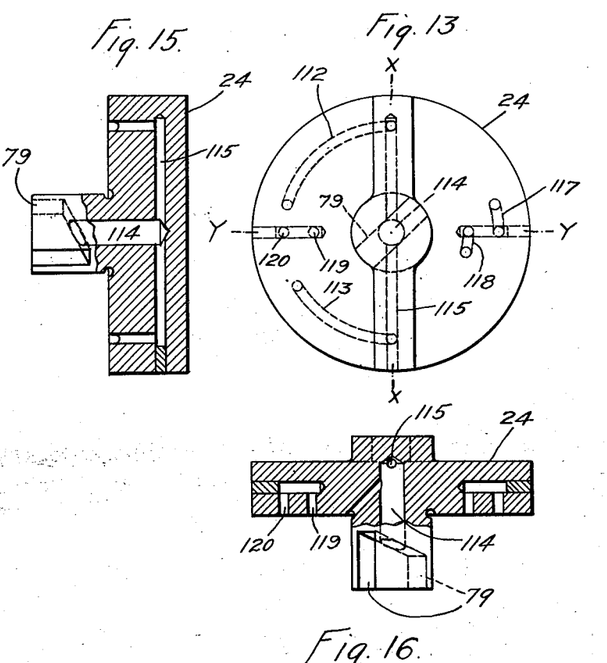
Fig. 13 is a plan view of the master control valve from the top.
Fig. 15 is a view partially in elevation and partially in section along the line X—X of Fig. 13.
Fig. 16 is a corresponding view in which the section is taken along the line Y—Y of Fig. 13.
Figure 14:
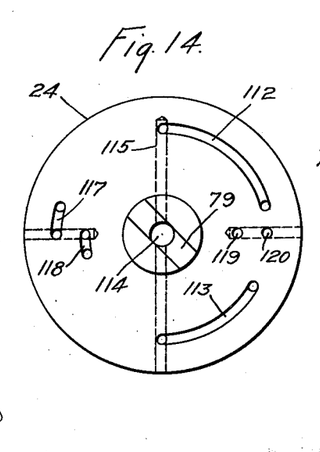
Fig. 14 is a bottom plan view of the valve.
Figure 17:
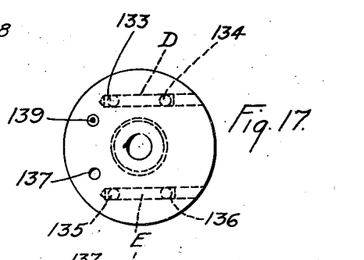
Fig. 17 is a top plan view of one of the auxiliary valves.
Figure 18:
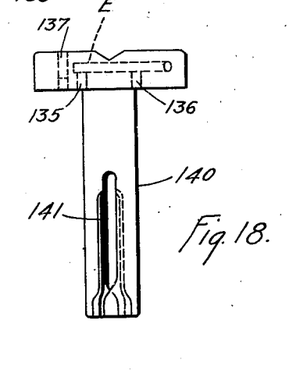
Fig. 18 is a side elevation of the valve shown in Fig. 17.

The seat 75 of the master valve 24 is provided with a series of ports GV1, GV2, GV3, and GV4, which communicate through the respective passages GV1a, GV2a, GV3a, and GV4a with the valve seats of the respective gear-actuating valves 25, 26, 27, and 28. (See Figs. 7, 8, 9 and 10.) It is also provided with four ports R, each of which communicates with a drilled passage 104, which, in turn, communicates with a port 105 formed in the valve seat 28a of the valve 28. The seat 75 is also provided with four ports CC, each of which communicates through a drilled passage 106 with the operating cylinder of the clutch mechanism 21. Ports GC1, GC2, GC3 and GC4 are also provided in the seat 75 and they respectively communicate through drilled passages GC1a, GC2a, GC3a, and GC4a with the cylinders 107, 108, 109, and 110 at a point above the plunger located in each cylinder, as is illustrated at 111 in Fig. 10. A port A is also provided in the seat 75, which communicates with the atmosphere. The master valve 24, as illustrated in Figs. 14, 15, and 16, is provided on its seat-engaging face with arc-shaped slots 112 and 113 which communicate with a central port 114 by means of passages 115 formed within the valve. The central port communicates with the atmosphere through a passage 116 formed within the shaft 71 as shown in Fig. 3. The seat-engaging face of the valve is also provided with elongated slots 117 and 118, which communicate with each other through an interior passage, and ports 119 and 120 which also communicate with each other through an interior passage formed within the valve. These ports and slots, formed in the seat-engaging face of the valve 24, are adapted to establish communication between certain ports of the valve seat 75 when the valve 24 is turned to different positions, as will be described.

Figure 10:
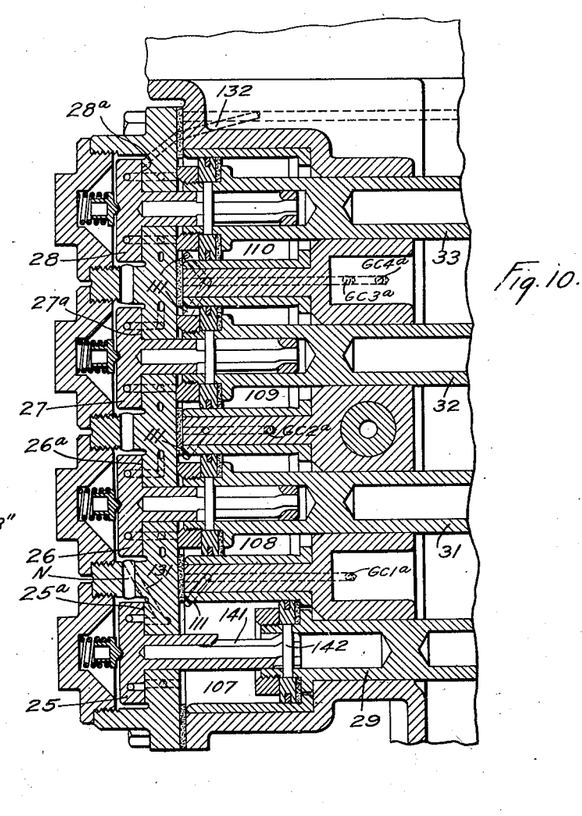
Fig. 10 is a fragmental sectional view along the line Y—Y of Fig. 9 and illustrates the arrangement of auxiliary valves and gear-shifting plungers which form details of the illustrated embodiment of my invention.

Each of the gear-shifting or auxiliary valves, shown in Fig. 10, operates through the master valve and in some instances there is a coöperation between the gear-shifting valves and the master valve, which interlocks the gears of the mechanism 20 and prevents more than one gear from being thrown into operation at a time.

The valve seat 28a is provided with the port 105, which communicates with the ports R through the passage 104, a port 122, which communicates with a passage 128, a port 123, which communicates with the atmosphere through a passage 124, and a port 125 which communicates with the port GV4 of the master valve seat through the passage GV4a. This valve seat is also provided with a port 126 which communicates directly with the cylinder 110. The seat 27a of the valve 27 is provided with a port 127, which communicates with the passage 128. The seat 27a is provided with ports 122', 123', and 126' which are correspondingly located to the similarly numbered ports above described, and which communicate with corresponding passages. It is also provided with a port 125' which communicates with the port GV3 of the master valve seat through the passage GV3a. The ports of the seat 26a of the valve 26 are similar to those just described and the port 125'' communicates with the port GV2 of the master valve through the passage GV2a. The seat 25a of the reversing valve 25 is provided with a port 130 which receives main reservoir pressure through a passage 131 (Fig. 10) from the interior of the valve chamber which incloses all of the auxiliary valves. This valve chamber receives main reservoir pressure through a passage 132 shown in Fig. 9, and consequently all the gear-actuating valves are subjected to main reservoir pressure. The seat 25a is also provided with ports 122''', 123''', 125''', and 126''', which correspond in location and in function to the similarly numbered ports of the valve seats described. Each gear-shifting valve is provided with ports 133, 134, 135, and 136 in its seat-engaging face. The ports 133 and 134 are connected together by means of an interior passage D, and the ports 135 and 136 are similarly connected by a passage E. Each valve is also provided with a port 137 which extends through it and is of ample area to admit actuating air pressure from the valve chamber. A small or restricted port 139 is also provided in each valve and it extends through the valve and is of such area that it is capable merely of maintaining the actuating pressure within the coöperating plunger cylinder after the plunger has shifted in response to pressure.

The stem 140 of each gear-actuating valve extends downwardly through the valve seat and is provided with a slot 141 which is engaged by a pin 142 carried by the coöperating plunger. The slot 141 is of such shape that the valve is turned on its seat as the plunger coöperating with it reaches the outer end of its gear-shifting stroke.

With all of the gear-actuating valves in their initial positions, main reservoir pressure from the valve chamber is delivered from the passage 131, the port 130, the passage D of the valve 25, the passage 128'', the passage D of the valve 26, the passage 128', the passage D of the valve 27, the passage 128, the passage D of the valve 28, and the port 105 to the passage 104, which communicates with the ports R of the master valve seat 75.

With the valves in this position, the port GV1 of the master valve seat is placed in communication with the atmosphere through the passage E of the valve 25, and the ports GV2, GV3, and GV4 are likewise placed in communication with the atmosphere by means of the respective valves 26, 27, and 28.

Figure 12:
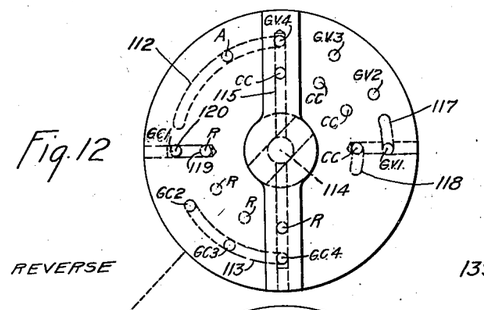
Fig. 12 is a plan view of the seat of the master control valve.

If now the master valve is moved to the reverse position diagrammatically shown in Fig. 12, in which the finger 84 (Fig. 11) engages the recess 87 of segment 85, air under pressure will be delivered to the port GC1 of the seat 75 and consequently to the cylinder 107 of the operating plunger 29.

As illustrated, the ports GC2, GC3, and GC4 are placed in communication with the atmosphere through the valve slot 113 and the central port 114 of the valve 24; the port GV4 is placed in communication with the atmosphere through valve slot 112 of the valve and the port A of the seat 75; one of the ports R is placed in communication with the port GC1 by means of valve ports 119 and 120; and one of the ports CC is placed in communication with the port GV1 by means of valve slots 117 and 118. All of the other ports of the valve seat 75 are blanked.

This places all of the cylinders 108, 109, and 110 in communication with the atmosphere, and places the operating cylinder of the clutch mechanism in communication with the atmosphere, since the port GV1, with which it communciates, in turn communicates with the atmosphere through passage E of the valve 25 and the atmospheric discharge passage 124'''. Reservoir pressure is delivered from the open port R through the port GC1, and the communicating passages, to the cylinder 107 of the plunger 29. This actuates the plunger and causes it to move to the outer end of its stroke. As it reaches the outer end of its stroke, the valve 25 is shifted to the position shown in Fig. 9, by the operation of pin 142 and slot 141, and blanks the port 130, which delivers main reservoir pressure, through all the auxiliary valves, to the ports R of the master valve seat 75. The shifting of the valve 25 also moves the port 139 into register with the port 126''', thereby delivering main reservoir pressure from the valve chamber directly through the valve to the cylinder 107, and maintains the plunger 29 under main reservoir pressure. The port 137 of the valve 25 is also moved into register with the port 125''', of the seat 25a, thereby delivering main reservoir pressure through the valve 25 to the port GV1 of the master valve and to the clutch-operating cylinder.

Figure 4:
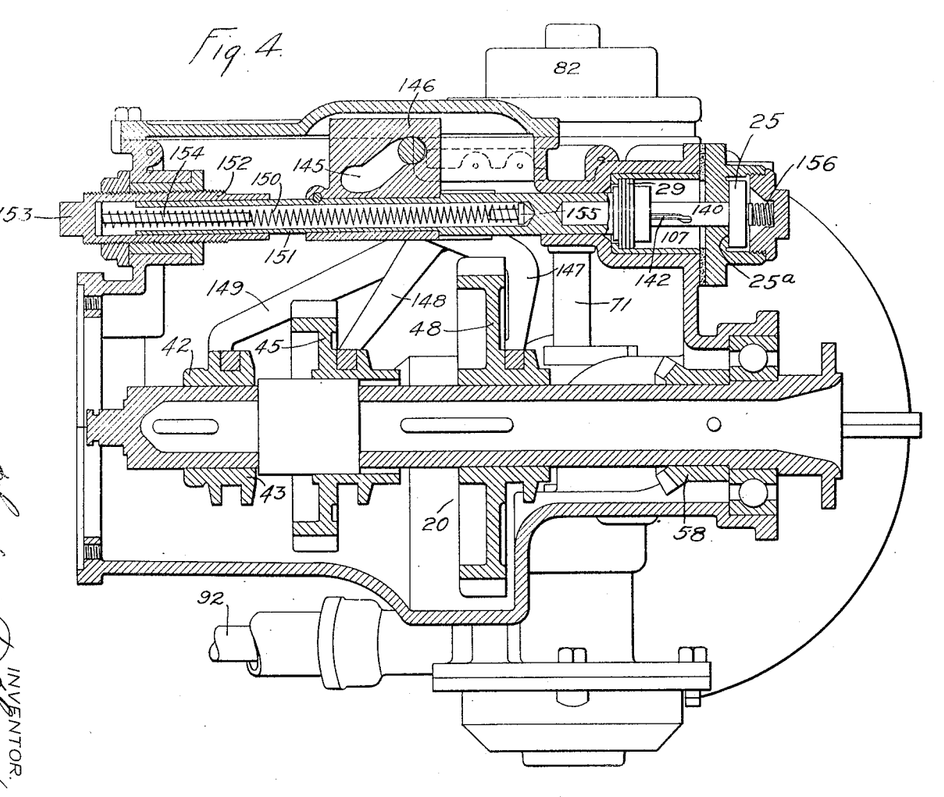

The moving of the master valve to the reverse position simultaneously exhausts the clutch-operating cylinder and delivers actuating pressure to cylinder 107. The clutch mechanism 21 is therefore thrown out and the plunger 29 in moving in response to the pressure delivered to it through passage GC1a swings the gear 51 into mesh with gears 48 and 49 through the agency of the lever 52, which engages a slot 145 formed in a block 146 carried by a plunger 29, as shown in Figs. 4 and 6. As soon as this is accomplished, the turning of the valve 25 delivers air under pressure to the operating cylinder of the clutch mechanism 21 and renders it operative or throws it in. The lever-actuating slot 145 (Fig. 4) is so designed that the gear 51 will be shifted prior to the time that the plunger 29 reaches the end of its stroke.

Figure 19:
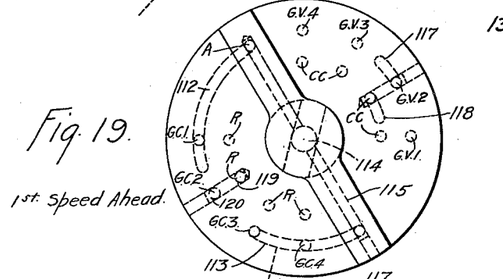
Figs. 19, 20 and 21, illustrate the master valve in three different operating positions.

When the master valve is moved from the position indicated in Fig. 12 to the position indicated in Fig. 19, the ports GC3 and GC4 are placed in communication with the central atmospheric port 114 by the valve slot 113 and the port GC1 is placed in communication with that port by the valve slot 112. The cylinders 107, 109, and 110 are therefore placed in communication with the atmosphere. The port GC2 is, however, placed in communication with one of the ports R by the valve ports 120 and 119, thereby delivering reservoir pressure to the cylinder 108, provided all of the gear-actuating valves are located in their initial positions. One of the ports CC, communicating with the clutch-actuating cylinder through passage 106, is placed in communication with the port GV2 by means of the valve ports 117 and 118, and consequently the clutch-actuating cylinder is placed in communication with the atmosphere through the passage E of valve 26 and the atmospheric port 124'' (Fig. 9). The plunger 31, moving in response to air pressure delivered to the cylinder 108, not only shifts the gear 48 into mesh with the gear 49, but it also turns the valve 26, after the gear-shifting operation is completed and as it reaches the end of its stroke. This turning of the valve 26 moves the valve passage D out of register with the passages 128'' and 128' and in this way shuts off the supply of main reservoir pressure to the port R of the master valve seat. The turning of the valve 26 also moves the port 139 into register with the port 126'' of the seat 26a and delivers air under pressure from the valve chamber through the valve directly to the cylinder 108. The port 137 of the valve 26 is also moved into register with the port 125'' of the seat 26a, thereby delivering reservoir pressure from the valve chamber to the port GV2 of the master valve seat through the passage GV2a. This delivers actuating pressure to the operating cylinder of the clutch mechanism 21 and renders the clutch operative or throws it in. When the master valve 24 is moved to different positions shown in Figs. 20 and 21, the respective plungers 32 and 33 will be rendered operative, it being understood that each gear or gear shift must be in the neutral position before another gear or gear shift can be rendered operative. This is evidenced by the fact that the gear-shifting or auxiliary valves must all be located in the neutral or initial position before actuating pressure can be delivered to the ports R of the master valve, or to any one of the gear-actuating plungers. As the master valve is moved to different positions described and illustrated, the pin 84 will move into engagement with one or another of the segment recesses shown in Fig. 11ᵃ and the handle 95 will therefore indicate which gear train is operative as the driving agent of the vehicle.

Figure 2:
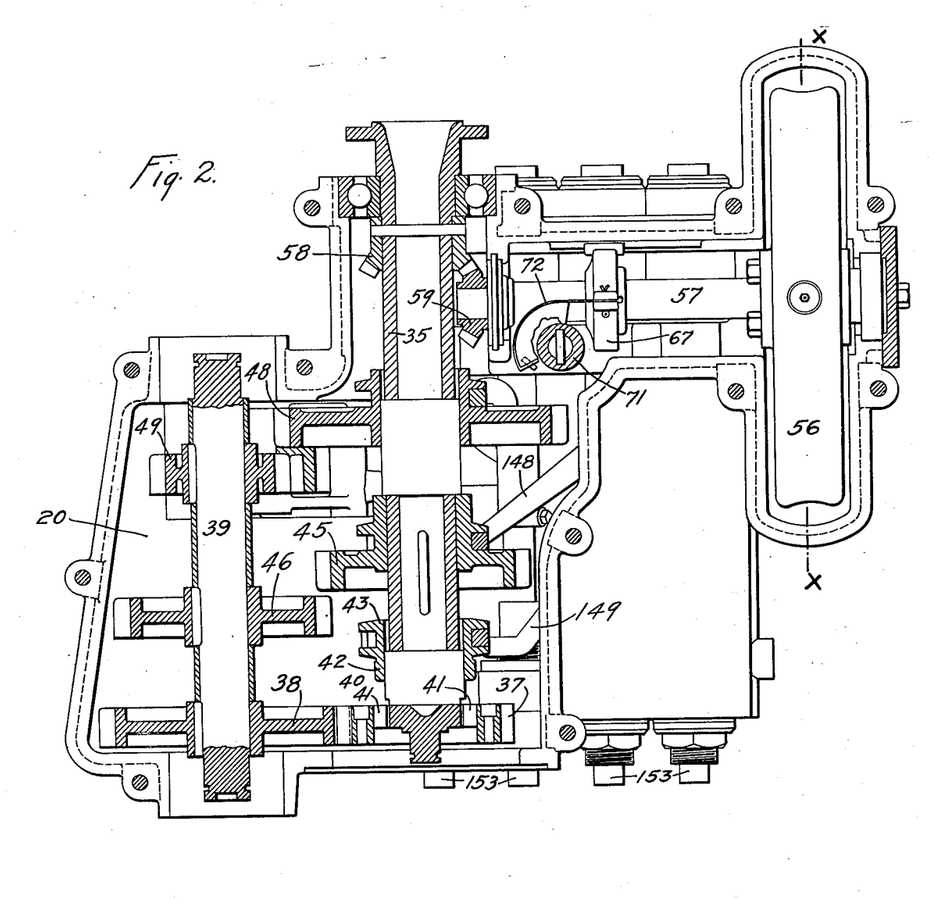
Fig. 2 is a sectional view of the mechanism shown in Fig. 1, looking at the mechanism from below.

As illustrated in Figs. 2, 4, and 6, the plunger 31 is operatively connected to the gear 48 by means of an arm 147 which is rigidly secured to the plunger and is operatively connected to a strap or collar which is loosely mounted on the gear. The plunger 32 is similarly connected to the shiftable gear 45 by means of an arm 148, and the shiftable sleeve 43 of the clutch 40 is similarly secured to the plunger 33 by means of an arm 149. The plungers are so arranged that as they move outwardly in response to actuating pressure, each moves in opposition to a coiled spring 150 (see Fig. 4) and renders the device controlled by it operative as a driving agent of the vehicle.

As illustrated, each plunger is provided with a tubular extension 151 which projects into a guide 152 forming a part of a cap nut 153, which is adjustable for the purpose of adjusting the pressure of the plunger-actuating spring 150. A spring stiffening pin 154 is located in the guide 152 and projects into the extension 151. This pin is surrounded by the spring 150 which bears against the head of the pin at one end and is provided at the other end with a pointed spring block 155, which projects into a centering recess and transmits the pressure of the spring to the plunger. Each spring 150 must be of sufficient strength to move the speed change device, actuated by its corresponding plunger, to the inoperative position when the corresponding plunger cylinder is exhausted.

Each of the gear-actuating valves is provided with a spring 156, similar to the spring 81 of valve 24, for holding it to its seat, and the valve 24, like the gear-shifting valves, may, if desired, be held to its seat by reservoir pressure.

In a co-pending application filed by me on June 6, 1913, serially numbered 772018, I have illustrated and described a clutch similar to the clutch mechanism 21 illustrated in Fig. 1, and I will therefore give a brief description of the mechanism only.

As illustrated, the clutch mechanism includes a member 158 splined or otherwise secured to the shaft 34 and a piston 159 which is operatively secured to the shaft 36 in such a way that, while it is capable of transmitting rotary motion to the shaft, it is movable longitudinally with relation to it. A sleeve 160 forming a part of the piston carries a number of clutch disks 161 which interleave with clutch disks 162 mounted on arms or a cage 163 secured to the member 158. A plate 164 is secured to the piston sleeve 160, and operates to compress the nest of disks 161 and 162 when fluid pressure is delivered to the piston 159. In this way the clutch mechanism 20 is rendered operative or is thrown in. The motion of the piston 159 is opposed by a coiled spring 165 which also operates to move the plate 164 from left to right (Fig. 1), when the piston is relieved of fluid pressure, and to thereby break the clutching engagement between the disks 161 and 162. The clutch mechanism is inclosed within a stationary casing 166, provided with a port 167 with which the passage 106 (Fig. 7) communicates. The casing 166 is sealed by packings 168 and 169, and the fluid pressure delivered to the casing acts on one side only of the piston 159, the other side being exposed to atmospheric pressure to which the interior of the cylinder 170, inclosing the piston 159, is exposed.

The automatic operation of the apparatus is as follows:

With the vehicle at rest the weights 55 are held in their innermost positions by the spring 74, (Fig. 3) acting through the agency of the curved bar-springs 72 and the plunger 61; consequently the master valve 24 occupies the position illustrated in Fig. 19, in which the low speed gears 48 and 49 are held in mesh with each other through the agency of the gear-shifting plunger 31. The vehicle, in starting, will therefore be propelled through the low speed gears, it being understood, of course, that means are employed for rendering the clutch mechanism 21 inoperative until after the engine is brought up to speed. This may be accomplished by starting the engine before the actuating air pressure is delivered to the passage 132, (Fig. 10) and consequently to the various operating plungers of the speed change mechanism 20 and the clutch mechanism 21.

As soon as the vehicle starts to move, the weights 55 start to revolve and are therefore subjected to centrifugal force, which tends to move them outwardly, in opposition to the tension of the spring 74, and to shift the position of the master valve 24. This pull of the weight is not only resisted by the spring 74 but also by the finger 84 which, with the valve 24 in the position described, engage the recess 88 on segment 85.

Figure 20:
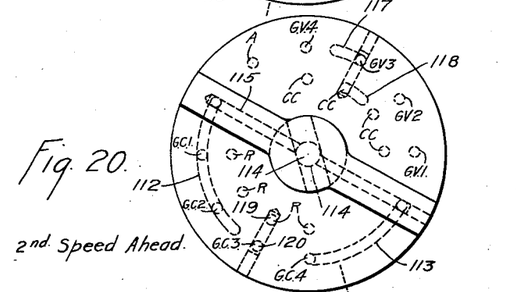

After the vehicle has attained a determined speed, the centrifugal pull of the weights 55 is sufficient to disengage the finger 84 from the recess 88, and to turn the shaft 71, in opposition to the tension of the spring 74, to such a position that the finger 84 engages the recess 89, and the master valve occupies the position shown in Fig. 20. The shifting of the master valve exhausts the cylinder 108 of the plunger 31, and also exhausts the operating pressure from the clutch actuating plunger or piston 159. The plunger 31 is therefore moved to its initial position by its actuating spring 150, and the clutch mechanism 21 is thrown out. The movement of the plunger 31 shifts the gear 48 out of mesh with the gear 49, and turns the valve 26 to its normal or initial position. With the valve 26 in this position, actuating pressure is delivered through the interlocking passages 128″, 128′ and 128 to the ports R of the master valve seat 75. As soon as this is accomplished, actuating pressure is delivered to the cylinder 109 of the plunger 32, and as that plunger reaches the end of its gear-shifting stroke, it turns the valve 27, and thereby delivers actuating pressure to the clutch-operating piston 159 and throws the piston in. This movement of the plunger 32 shifts the gear 45 into mesh with the gear 46. It will be noted that the interlocking air passages not only prevent more than one of the gear-shifting plungers from being rendered operative at one time, but also insure the throwing out of the clutch mechanism 21 prior to the operation of any one of the gear-shifting plungers.

Figure 21:
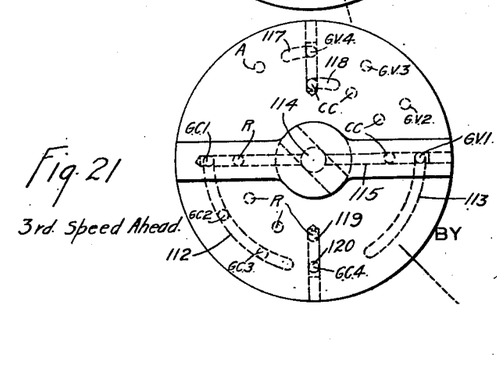

If now, the road conditions are such that the engine is not fully loaded while driving the vehicle through the intermediate gears, it will speed up and the shaft 35 will finally attain such speed that the weights 55 will shift the master valve to the position illustrated in Fig. 21, in which the clutch 40 is thrown in, through the agency of the plunger 33, and the propelling shaft 44 of the vehicle is directly connected to the engine shaft 34.

If, during the operation of the vehicle the road conditions vary in such a way as to overload the engine, the shaft 35 will slow down, thereby reducing the centrifugal pull of the weights, and eventually causing the tension of the spring 74 to preponderate over the pull of the weights to such an extent as to shift the master valve and reduce the load of the engine by throwing in one or the other of the low-speed gears 45 or 48. For example, if the road conditions are such that the engine cannot drive the vehicle through the high speed connection without being overloaded, the intermediate speed gears will be rendered effective by the operation of the plunger 32, and if the road conditions are such that the engine is still overloaded, the low speed gears will be rendered effective by the operation of the plunger 31. The automatic control mechanism 23 therefore operates to maintain a substantially constant load on the engine, for all variations of the road conditions, and prevents the engine from being overloaded and from stalling, while operating through the high or intermediate speed gears.

While I have described but one embodiment of my invention, it will be apparent to those skilled in the art that various changes, modifications, substitutions, additions and omissions may be made in the apparatus illustrated without departing from the spirit and scope of the invention as set forth by the appended claims.

What I claim is:

1. In combination with a transmission mechanism, a driven shaft, a load responsive device responsive to variations in the speed of the driven shaft of said mechanism for controlling the operation of said mechanism, and manually actuated means for controlling the operation of the mechanism and for rendering the load responsive mechanism ineffective.

2. In combination with the driving shaft and the propelling shaft of a vehicle, a speed change mechanism, a clutch mechanism between the driving shaft and the speed change mechanism, and automatic means responsive to variations in the speed of the propelling shaft for controlling the operation of the speed change mechanism and the clutch mechanism, and means for manually controlling the mechanism.

3. In combination with the driving shaft and the propelling shaft of a vehicle, a speed change mechanism, a clutch mechanism between the driving shaft and the speed change mechanism, automatic means responsive to variations in the speed of the propelling shaft, for controlling the operation of the speed change mechanism and the clutch mechanism, and manually controlled means for controlling the operation of said speed change and said clutch mechanisms and for rendering said automatic means ineffective.

4. In combination with the driving shaft and the propelling shaft of a self-propelled vehicle, a speed change mechanism, automatic means for shifting the gears of said mechanism including an interlocking mechanism whereby but one gear shift is capable of being rendered operative at a time.

5. In combination with the driving and propelling shaft of a self-propelled vehicle, speed change gears between the two shafts, automatic means responsive to the speed of the propelling shaft for controlling the operation of the speed change gears, and means for preventing the automatic means from hunting during its operation.

6. A change speed gear mechanism, pressure-actuated plungers for controlling the operation of said mechanism, a master valve controlling the operation of said plungers, and auxiliary valves coöperating with said master valve in the control of said plungers.

7. A change speed gear mechanism, pressure-actuated plungers for controlling the operation of said mechanism, a master valve for controlling the operation of said plungers, and interlocking valves controlled by said plungers coöperating with the master valve in the control of the plungers.

8. A change speed gear mechanism, pressure-actuated plungers for controlling the operation of said mechanism, a master valve for controlling the operation of said plungers, interlocking valves controlled by said plungers coöperating with the master valve in the control of the plungers, and load-responsive means for controlling the operation of said master valve.

9. In combination with a speed change mechanism, pressure-actuated means for shifting the gears of said mechanism, a master valve for controlling the operation of said means, interlocking pressure delivery valves, actuated by said means, for delivering actuating pressure to said master valve and for coöperating with the master valve in the control of said means.

10. In combination in a self-propelled vehicle, an engine shaft, a propelling shaft, a speed change mechanism between the engine shaft and the propelling shaft of the vehicle, a clutch mechanism between the engine shaft and the speed change mechanism, pressure actuated plungers for controlling the operation of said speed change mechanism, a pressure-actuated plunger for controlling the operation of said clutch mechanism, a master valve and auxiliary valves actuated by said plungers for coöperating with the master valve in controlling the delivery of actuating pressure to said plungers.

11. In combination with a transmission mechanism, a driving member, a driven member, a speed change mechanism between said members, load responsive means driven by the driven member for controlling the operation of said speed change mechanism, and means for instantly rendering the mechanism subject to manual control.

12. In combination with a power developing apparatus, an agent driven by said apparatus, means for controlling the torque transmitted from said apparatus to said agent, means responsive to fluid pressure for controlling said means, a mechanism responsive to the speed of the driven agent for controlling the operation of said last mentioned means, and means for manually controlling the operation fluid pressure responsive means.

13. In combination with a power developing apparatus, an agent driven thereby, separate means for controlling the torque transmitted from said apparatus to said agent, a master control mechanism for controlling the delivery of actuating fluid to said separate means, a device responsive to variations in the speed of the driven agent for controlling the operation of the mechanism, and means for manually controlling the master control.

14. In combination with a transmission mechanism, a driving member, a driven member, speed change gears for transmitting power from the driving member to the driven member, means responsive to variations in speed of the driven member for shifting said gears, and means for rendering the shifting means inoperative after the gears have shifted in response to a change in speed of the driven member.

15. In combination with a power developing apparatus, an agent driven by said apparatus, means responsive to fluid pressure for controlling the delivery of power from said apparatus to said agent, a centrifugal mechanism responsive to the speed of the driven agent for controlling the delivery of motive fluid to said means, and means for manually controlling the apparatus.

In testimony whereof, I have hereunto subscribed my name this 25th day of August, 1915.

HERBERT T. HERR.